(12) United States Patent
Smith

(10) Patent No.: US 11,880,375 B2
(45) Date of Patent: Jan. 23, 2024

(54) SEARCH TOOL USING A RELATIONSHIP TREE

(71) Applicant: BENEVOLENTAI TECHNOLOGY LIMITED, London (GB)

(72) Inventor: Daniel Paul Smith, London (GB)

(73) Assignee: BenevolentAI Technology Limited, London (GB)

( * ) Notice: Subject to any disclaimer, the term of this patent is extended or adjusted under 35 U.S.C. 154(b) by 284 days.

(21) Appl. No.: 17/041,550

(22) PCT Filed: Mar. 28, 2019

(86) PCT No.: PCT/GB2019/050890
§ 371 (c)(1),
(2) Date: Sep. 25, 2020

(87) PCT Pub. No.: WO2019/186169
PCT Pub. Date: Oct. 3, 2019

(65) Prior Publication Data
US 2021/0073223 A1  Mar. 11, 2021

(30) Foreign Application Priority Data
Mar. 28, 2018  (GB) ..................... 1805067

(51) Int. Cl.
*G06F 16/2455* (2019.01)
*G06F 16/28* (2019.01)
(Continued)

(52) U.S. Cl.
CPC ...... *G06F 16/2465* (2019.01); *G06F 16/2455* (2019.01); *G06F 16/26* (2019.01); *G06F 16/288* (2019.01)

(58) Field of Classification Search
CPC ............. G06F 16/2465; G06F 16/2455; G06F 16/248; G06F 16/26; G06F 16/288
See application file for complete search history.

(56) References Cited

U.S. PATENT DOCUMENTS

| | | | |
|---|---|---|---|
| 9,201,964 B2 * | 12/2015 | Zhiyanov | G06F 16/2465 |
| 10,509,844 B1 * | 12/2019 | Mcintyre | G06F 40/205 |
| 2009/0187517 A1 * | 7/2009 | Mihalkova | G06F 16/212 706/12 |

(Continued)

FOREIGN PATENT DOCUMENTS

| | | |
|---|---|---|
| WO | 2006/103615 A1 | 10/2006 |
| WO | 2011/151500 A1 | 12/2011 |

OTHER PUBLICATIONS

PCT Written Opinion and Search Report issued in related PCT application No. PCT/GB2019/050890 dated Jun. 4, 2019.

(Continued)

*Primary Examiner* — Alicia M Willoughby
(74) *Attorney, Agent, or Firm* — Smith Baluch LLP

(57) ABSTRACT

A system for determining biological entities of interest is described. The system comprises a user input module configured to receive a search term comprising a representation of a biological entity; a search module configured to determine which biological entities of a set have a known association with the biological entity of the search term, those having a known association being results and those not having a known association being non-results, wherein biological entities of the set are related to each other by parent-child relationships in a relationship tree; and an analysis module configured to determine biological entities of interest by identifying non-results that have one or more results within a boundary in the relationship tree.

16 Claims, 12 Drawing Sheets

(51) Int. Cl.
*G06F 16/26* (2019.01)
*G06F 16/2458* (2019.01)

(56) References Cited

U.S. PATENT DOCUMENTS

| | | | | |
|---|---|---|---|---|
| 2011/0047169 | A1* | 2/2011 | Leighton | G16H 50/70 707/E17.014 |
| 2011/0238690 | A1* | 9/2011 | Arrasvuori | G06F 16/00 707/769 |
| 2013/0110763 | A1* | 5/2013 | Dove | G06F 40/30 706/55 |
| 2013/0117310 | A1* | 5/2013 | Chai | G06F 16/972 707/774 |
| 2013/0325847 | A1* | 12/2013 | Suchter | G06F 16/951 707/E17.082 |
| 2014/0280044 | A1* | 9/2014 | Huynh | G06F 16/24578 707/722 |
| 2015/0178282 | A1* | 6/2015 | Gorur | G06F 16/9535 707/748 |
| 2015/0332158 | A1* | 11/2015 | He | G06F 16/9024 706/52 |
| 2016/0063106 | A1* | 3/2016 | Chai | G06F 16/9024 707/E17.014 |
| 2016/0267409 | A1* | 9/2016 | Vatnani | G06Q 10/0637 |
| 2017/0154108 | A1* | 6/2017 | Kraus | G06F 16/367 |
| 2017/0262925 | A1* | 9/2017 | Rangasamy Kannadasan | G06Q 30/0603 |
| 2018/0320233 | A1* | 11/2018 | Perkins | G16H 10/40 |
| 2019/0065620 | A1* | 2/2019 | Murray | G06N 5/022 |
| 2019/0188332 | A1* | 6/2019 | Ingvaldsen | G06F 16/9024 |

OTHER PUBLICATIONS

European Office Action issued in related European Patent Application 19 717 969.0 dated Jul. 30, 2021.

* cited by examiner

| Entity | Score | | Score ≥ 2.0 |
|---|---|---|---|
| 01 | ½ | = 0.5 | |
| 02 | 1/1 + 1/1 + 1/3 | = 2.33 | ✓ |
| 03 | ½ | = 0.5 | |
| 04 | ½ | = 0.5 | |
| 05 | ½ | = 0.5 | |
| 06 | 1/1 + 1/1 | = 2.0 | ✓ |
| 07 | ½ | = 0.5 | |
| 08 | ½ | = 0.5 | |
| 09 | 1/1 | = 1.0 | |
| 10 | 1/1 + 2/3 + 1/4 + ½ + 3/3 | = 3.25 | ✓ |
| 11 | 2/2 + 1/3 | = 1.33 | |
| 12 | 2/1 + ½ | = 2.5 | ✓ |
| 13 | 1/1 + 3/2 | = 2.5 | ✓ |
| 14 | 1/1 + 3/2 | = 2.5 | ✓ |
| 15 | ½ | = 0.5 | |

*FIG. 10*

| Entity | Score |
|---|---|
| 10 | 3.25 |
| 12 | 2.5 |
| 13 | 2.5 |
| 14 | 2.5 |
| 2 | 2.33 |
| 6 | 2.0 |

*FIG. 11*

SEARCH TOOL USING A RELATIONSHIP TREE

CROSS-REFERENCE TO RELATED PATENT APPLICATIONS

This patent application is the 35 U.S.C. 371 national stage of International Patent Application PCT/GB2019/050890 filed 28 Mar. 2019; which claims the benefit of priority to GB Application 1805067.4 filed 28 Mar. 2018, which is incorporated by reference herein for all purposes.

The present application relates to a system and computer-implemented method for performing searches using a relationship tree to support a user in knowledge discovery activities.

BACKGROUND

Knowledge discoverers in a range of fields are interested in deciphering new information from the available set of knowledge. Search engines provide a powerful information retrieval tool and are ideal for retrieving established facts and information from the public domain and other information sources. Typically, search results are presented in an ordered list in order of relevance, where the relevance is calculated using a searching algorithm. Results considered to be the most relevant are presented at the top of the list and results considered to be less relevant are presented further down.

It is not uncommon for search engines to generate tens or hundreds of pages of search results. This creates a problem of information overload for the user, and the user has limited ways of efficiently sifting through or filtering the results in a way that is meaningful. The order of relevance calculated by the searching algorithm dominates the user's way of managing and interacting with the results, and it is difficult for the user to detect patterns or trends that may be lurking in the pages of results. For example, it is very time-consuming for a user to find a significant result if it appears on page 100 of the search results. It is also difficult for a user to spot that a result on page 100 may be related to a result on page 204 in a potentially interesting way.

This presents a challenge for knowledge discoverers who are trying to discern previously unknown information such as patterns, trends and relationships from the available facts. For example, in the field of drug discovery, a drug discoverer may use a search engine to search for diseases that are related to a particular gene. All the diseases that are well-known as being associated with this gene are likely to be listed as being highly relevant at the top of the list of search results. If there is a small number of diseases that have an association with the gene but are not determined by the searching algorithm to be highly relevant, then these diseases are likely to appear further down the list, making it less likely that the drug discoverer will find them. Furthermore, if two diseases appearing far down the list are related to each other in a potentially interesting way, this is very difficult for the drug discoverer to find, especially if they are spread out for example across pages 10, 204 and 506.

The embodiments described below are not limited to implementations which solve any or all of the disadvantages of the known approaches described above.

SUMMARY

This Summary is provided to introduce a selection of concepts in a simplified form that are further described below in the Detailed Description. This Summary is not intended to identify key features or essential features of the claimed subject matter, nor is it intended to be used to determine the scope of the claimed subject matter.

The present disclosure provides a computer-implemented technique for determining biological entities of interest for the purposes of knowledge discovery.

In a first aspect, the present disclosure provides a system for determining biological entities of interest, the system comprising: a user input module configured to receive a search term comprising a representation of a biological entity; a search module configured to determine which biological entities of a set have a known association with the biological entity of the search term, those having a known association being results and those not having a known association being non-results, wherein biological entities of the set are related to each other by parent-child relationships in a relationship tree; and an analysis module configured to determine biological entities of interest by identifying non-results that have one or more results within a boundary in the relationship tree.

Preferably, the one or more results comprises at least a threshold number of results.

Preferably, the analysis module is configured to set the threshold number of results using a first threshold-defining user input.

Preferably, the boundary encompasses any parents, siblings and children of the non-result.

Preferably, the boundary encompasses any grandchildren of the non-result.

Preferably, the boundary encompasses any descendants of the non-result.

Preferably, the boundary encompasses any biological entities within a threshold tree traversal distance of the non-result.

Preferably, the boundary is defined using a boundary-defining user input.

Preferably, the analysis module is configured to calculate a score for each non-result.

Preferably, for each non-result, the more results there are within the boundary, the higher the score.

Preferably, for each non-result, the shorter a tree traversal distance in the relationship tree to a result within the boundary, the higher the score.

Preferably, the analysis module is configured to calculate the score using a function that is at least partially defined using a function-defining user input.

Preferably, the function-defining user input comprises a definition of at least part of the function using code or an equation tool.

Preferably, the function-defining user input comprises a user selection of a predefined function or a user selection of a predefined part of a function.

Preferably, the analysis module is configured to treat only non-results having a score equal to or above a threshold score as biological entities of interest.

Preferably, the analysis module is configured to set the threshold score using a second threshold-defining user input.

Preferably, the analysis module is configured to generate a list of the entities of interest ranked by their respective scores.

Preferably, the search module is configured to determine an association by querying a database.

Preferably, the database comprises association data curated by a user.

Preferably, the database comprises association data generated based on a machine learning prediction.

Preferably, the database comprises association data generated based on a co-occurrence in literature of the biological entity of the search term and a biological entity of the set, the co-occurrence being detected by a natural language processing tool.

Preferably, the search module is configured to generate association data by causing a machine learning algorithm to generate a machine learning prediction.

Preferably, the search module is configured to generate association data by causing a natural language processing tool to detect at least one co-occurrence in literature of the biological entity of the search term and a biological entity of the set.

Preferably, the user input module is configured to receive a confidence range input setting an acceptable range of confidence scores of the machine learning prediction to filter the association data.

Preferably, the user input module is configured to receive an evidence range input setting an acceptable range of evidence counts of the co-occurrences detected by natural language processing to filter the association data.

Preferably, the system comprises a visualisation module configured to render a visualisation of the relationship tree and a visual indication identifying each biological entity of interest.

Preferably, the visualisation of the relationship tree comprises duplicated biological entities.

Preferably, the visualisation module is configured to render a visual indication identifying each result.

Preferably, the visualisation module is configured to render a visual indication of an evidence type of an association of a result.

Preferably, the evidence type comprises human curation, machine learning prediction, or natural language processing.

Preferably, the set of biological entities comprises a set of diseases, genes, proteins, drugs, biological pathways, or biological processes.

Preferably, the search term comprises a representation of one or more of a disease, a gene, a protein, a drug, a biological pathway, or a biological process.

Preferably, the system is configured to enable user selection of the set of biological entities.

In a second aspect, the present disclosure provides a method of determining biological entities of interest, the method comprising: receiving a search term comprising a representation of a biological entity; determining which biological entities of a set have a known association with the biological entity of the search term, those having a known association being results and those not having a known association being non-results, wherein biological entities of the set are related to each other by parent-child relationships in a relationship tree; and determining biological entities of interest by identifying non-results that have one or more results within a boundary in the relationship tree.

Preferably, the one or more results comprises at least a threshold number of results.

Preferably, the method comprises setting the threshold number of results using a first threshold-defining user input.

Preferably, the boundary encompasses any parents, siblings and children of the non-result.

Preferably, the boundary encompasses any grandchildren of the non-result.

Preferably, the boundary encompasses any descendants of the non-result.

Preferably, the boundary encompasses any biological entities within a threshold tree traversal distance of the non-result.

Preferably, the boundary is defined using a boundary-defining user input.

Preferably, the method comprises calculating a score for each non-result.

Preferably, for each non-result, the more results there are within the boundary, the higher the score.

Preferably, for each non-result, the shorter a tree traversal distance in the relationship tree to a result within the boundary, the higher the score.

Preferably, the method comprises calculating the score using a function that is at least partially defined using a function-defining user input.

Preferably, the function-defining user input comprises a definition of at least part of the function using code or an equation tool.

Preferably, the function-defining user input comprises a user selection of a predefined function or a user selection of a predefined part of a function.

Preferably, the method comprises treating only non-results having a score equal to or above a threshold score as biological entities of interest.

Preferably, the method comprises setting the threshold score using a second threshold-defining user input.

Preferably, the method comprises generating a list of the entities of interest ranked by their respective scores.

Preferably, the method comprises determining an association by querying a database.

Preferably, the database comprises association data curated by a user.

Preferably, the database comprises association data generated based on a machine learning prediction.

Preferably, the database comprises association data generated based on a co-occurrence in literature of the biological entity of the search term and a biological entity of the set, the co-occurrence being detected by a natural language processing tool.

Preferably, the method comprises generating association data by causing a machine learning algorithm to generate a machine learning prediction.

Preferably, the method comprises generating association data by causing a natural language processing tool to detect at least one co-occurrence in literature of the biological entity of the search term and a biological entity of the set.

Preferably, the method comprises receiving a confidence range input setting an acceptable range of confidence scores of the machine learning prediction to filter the association data.

Preferably, the method comprises receiving an evidence range input setting an acceptable range of evidence counts of the co-occurrences detected by natural language processing to filter the association data.

Preferably, the method comprises rendering a visualisation of the relationship tree and a visual indication identifying each biological entity of interest.

Preferably, the visualisation of the relationship tree comprises duplicated biological entities.

Preferably, the method comprises rendering a visual indication identifying each result.

Preferably, the method comprises rendering a visual indication of an evidence type of an association of a result.

Preferably, the evidence type comprises human curation, machine learning prediction, or natural language processing.

Preferably, the set of biological entities comprises a set of diseases, genes, proteins, drugs, biological pathways, or biological processes.

Preferably, the search term comprises a representation of one or more of a disease, a gene, a protein, a drug, a biological pathway, or a biological process.

Preferably, the system is configured to enable user selection of the set of biological entities.

The methods described herein may be performed by software in machine readable form on a tangible storage medium e.g. in the form of a computer program comprising computer program code means adapted to perform all the steps of any of the methods described herein when the program is run on a computer and where the computer program may be embodied on a computer readable medium. Examples of tangible (or non-transitory) storage media include disks, thumb drives, memory cards etc. and do not include propagated signals. The software can be suitable for execution on a parallel processor or a serial processor such that the method steps may be carried out in any suitable order, or simultaneously.

This application acknowledges that firmware and software can be valuable, separately tradable commodities. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

The preferred features may be combined as appropriate, as would be apparent to a skilled person, and may be combined with any of the aspects of the invention.

BRIEF DESCRIPTION OF THE DRAWINGS

Embodiments of the invention will be described, by way of example, with reference to the following drawings, in which:

FIG. 10 is a table showing calculation of scores for the candidates;

FIG. 11 is a table listing candidates scoring a threshold or higher;

Figure 1:
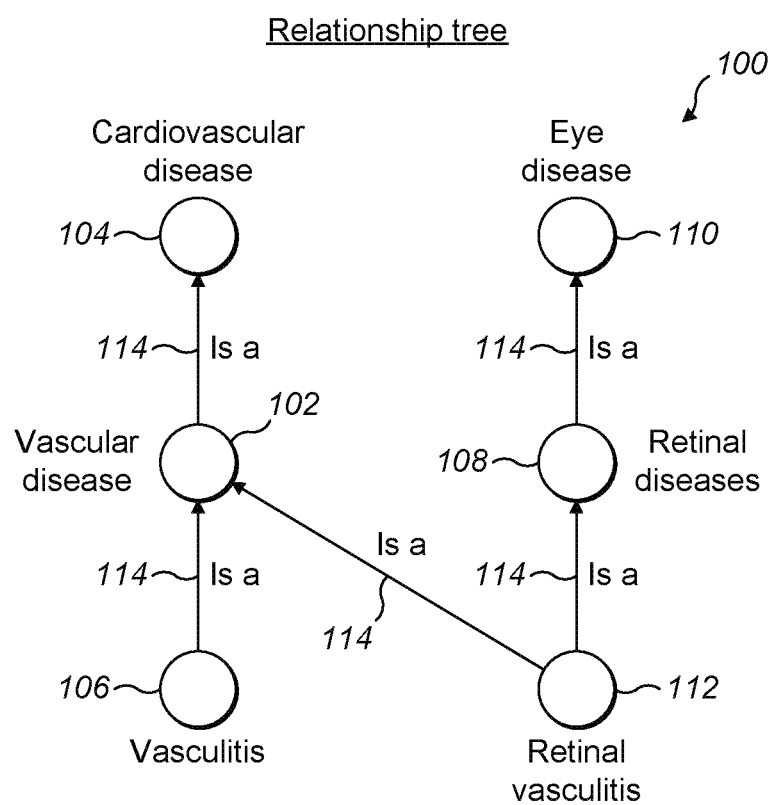
FIG. 1 is a schematic diagram showing parent-child relationships between a small subset of diseases.

Common reference numerals are used throughout the figures to indicate similar features.

DETAILED DESCRIPTION

Embodiments of the present invention are described below by way of example only. These examples represent the best ways of putting the invention into practice that are currently known to the Applicant although they are not the only ways in which this could be achieved. The description sets forth the functions of the example and the sequence of steps for constructing and operating the example. However, the same or equivalent functions and sequences may be accomplished by different examples.

Many entities are related to each other in a hierarchical structure that can be represented by a relationship tree. For example, fields of study may be organised according to a hierarchical ontology that categorizes the fields and defines the relationships between them. In this example, a branch of economics may have a subcategory and the subcategory have a further subcategory For example, sports are organised according to a hierarchical ontology that defines the relationships between them. Ball games include the subcategory of racquet and ball games which include tennis, squash and badminton. The category of ball games is therefore a parent of racquet and ball games and a grandparent of tennis, squash and badminton. However, the category racquet and ball games is also a subcategory of racquet games, so the category of racquet and ball games has two parents. The parent-child relationships of the ontology define a relationship tree of all the sports from which sibling, cousin and other relationships can be inferred.

Other entity types that have hierarchical relationships defining a relationship tree include family members, pipes in a sewers network, Wikipedia pages, documents in a library, and published patents.

In the biological space, there are many entity types that have a hierarchical ontology. For example, the set of diseases, of which there are around 20 000, has a hierarchical ontology. For example, vasculitis is a vascular disease which falls under the bracket of cardiovascular diseases. Vascular disease is therefore both a parent of vasculitis and a child of cardiovascular disease. Other biological entities having hierarchical ontologies include genes, proteins, drugs, biological pathways, biological processes, anatomical regions or anatomical entities, tissues, or cell types. Some non-biological entities having a hierarchical structure may still be relevant to a biological entity. For example, the set of published patents may be searched to find published patents mentioning a particular gene. Similarly, the set of clinical trials may be searched to find clinical trials directed towards a particular drug.

FIG. 1 illustrates a small portion 100 of a relationship tree of the set of all diseases. The portion 100 of the relationship tree includes vascular disease 102, its parent cardiovascular disease 104, and its child vasculitis 106. Each child-parent relationship in the portion 100 of the relationship tree is indicated by an arrow 114 from the child to the parent. The portion 100 of the relationship tree also includes retinal disease 108, its parent eye disease 110, and its child retinal vasculitis 112. Retinal vasculitis 112 has two parents: retinal disease 108 and vascular disease 102. This comes about because retinal vasculitis 112 is both a vascular disease 102 and a retinal disease 108.

Figure 2:
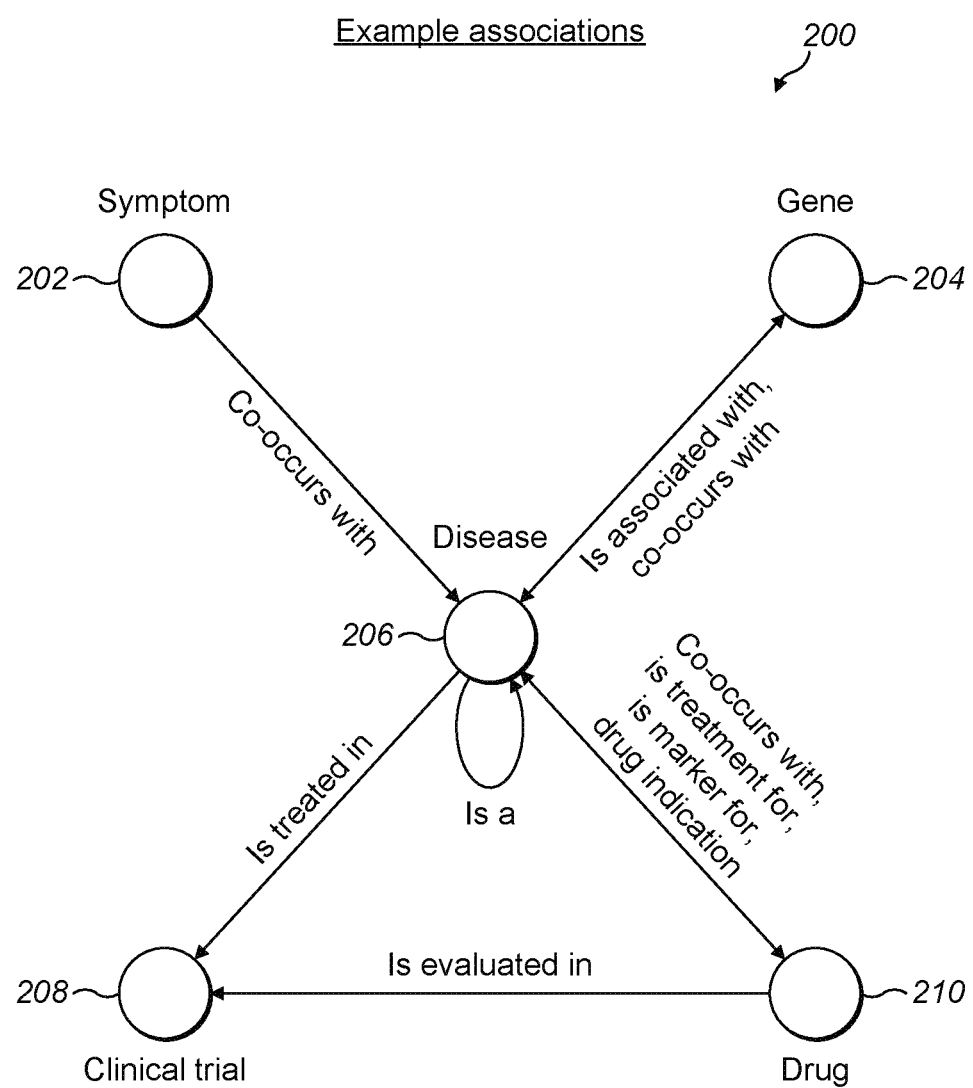
FIG. 2 is a schematic diagram of example associations between biological entities.

As well as being related by parent-child relationships to other entities of the same type, biological entities may also be associated with other entities. For example, a gene may be associated with a disease, or a drug may be associated with a clinical trial. FIG. 2 illustrates some examples 200 of associates that can exist between symptoms 202, genes 204, diseases 206, clinical trials 208, and drugs 210. For example, a symptom 202 may co-occur with a disease 206, and a disease 206 may be treated in a clinical trial 208. Similarly, a gene may co-occur with a disease 206, a disease 206 may be treatment for a drug 210, be a marker for a drug 210 or be evaluated in a clinical trial 208. It is also possible for a biological entity to have an association with another biological entity of the same type. For example, a disease may be associated with another disease by virtue of being related to it (for example retinal vasculitis is a child of retinal disease).

Based on these associations, a set of entities can be searched for all those that have a particular association. These entities that come up in the search results may be referred to as associated entities. For example, a set of diseases could be searched for all those diseases that are associated with a particular gene.

Figure 3:
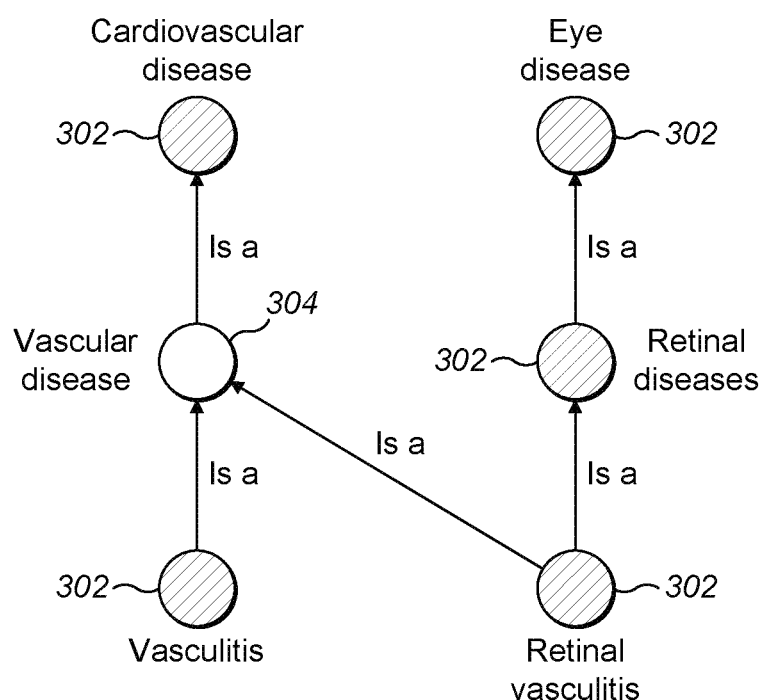
FIG. 3 is a schematic diagram showing a visual indication of which diseases of the above subset are associated with a particular gene.

FIG. 3 illustrates an example of this using the small subset of diseases from FIG. 1. The diseases that have a particular association, such as an association with a particular gene, are highlighted by a visual indication of the association such as a shaded circle 302. Diseases lacking the particular association are not highlighted by the visual indication. For example, vascular disease, which in this example lacks the particular association, is indicated by an unshaded circle 304.

The search for diseases associated with a particular gene may be implemented by searching a database of known associations. For example, in the biological space a database of associations may store known associations between diseases and other diseases, known associations between diseases and genes, and/or known associations between diseases and biological pathways.

For the purpose of knowledge discovery, it is the undiscovered associations that are of interest. These do not show up in the search for known associations because they are not yet known. However, if we highlight the associated entities that showed up in the search as described above for FIG. 3, then we know that the undiscovered associations are somewhere among the unhighlighted entities. Since the unhighlighted entities did not show up in the search, we may refer to them as 'non-results'. Similarly, we may refer to entities that showed up with a known association as 'results'. For example, in FIG. 3, vascular disease is a non-result, and the other five diseases are 'results'. The objective is to identify from among the non-results entities of interest that may have undiscovered associations.

When dealing with a large set of entities, such as the full set of around 20,000 diseases, there may be many non-results from which the entities of interest are to be identified. To get a sense of the possible scale, it is convenient to visualise the full set of around 20,000 diseases and then to overlay highlighting on top of results. This way, the number of unhighlighted diseases that count as non-results can be visualised.

When creating a visualisation of the set of all diseases, the complexity of the parent-child relationships should be considered. For example, a disease having many descendants may set up a branch of a relationship tree where the children of the disease fan out from the disease, and the grandchildren of the disease fan out from the children. However, if some of the diseases in this branch have multiple parents, some of which are located in other branches, then the branches are connected by further parent-child relationships. This creates complexity in the structure of the relationship tree such that it cannot be expressed as having a root disease from which groups of diseases branch out. However, this can be resolved by introducing duplication of diseases having multiple parents.

Figure 4:
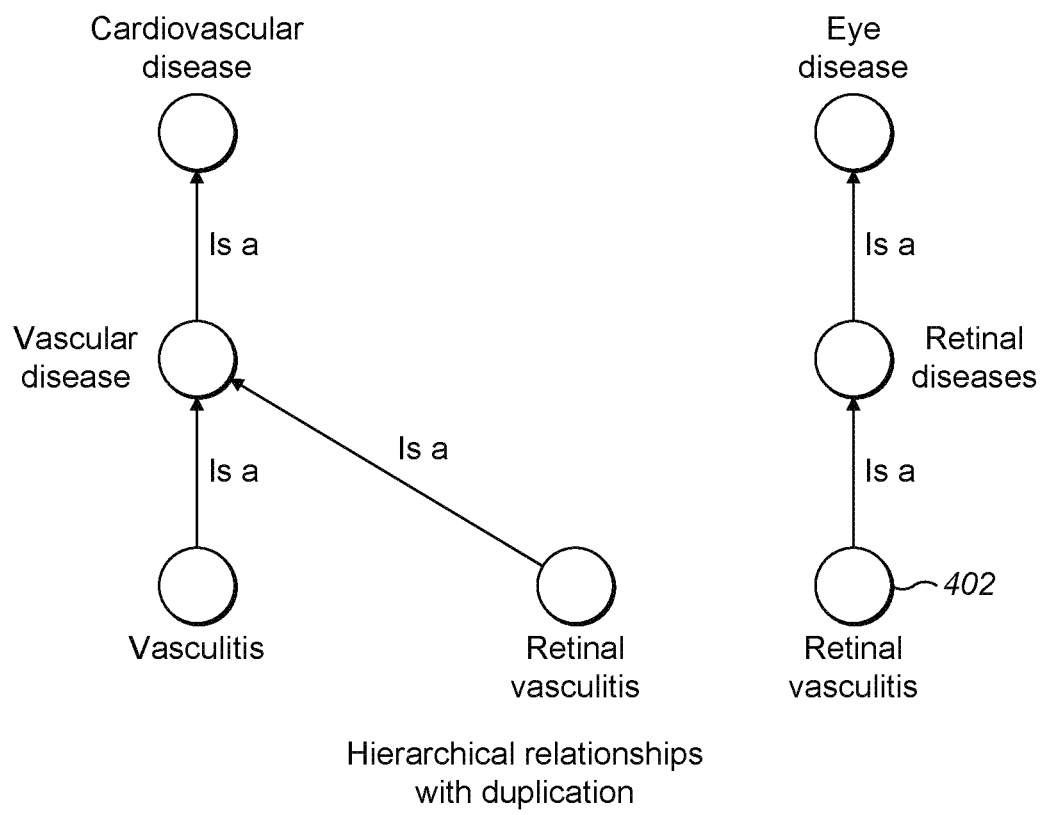
FIG. 4 is a schematic diagram showing the diseases of the above subset in which the disease retinal vasculitis is duplicated because it has multiple parent diseases.

FIG. 4 shows the same diseases as shown in FIGS. 1 and 3, except that retinal vasculitis 402 which has two parents is duplicated. This creates two separate branches, both of which include retinal vasculitis 402 because retinal vasculitis 402 is both a cardiovascular disease and an eye disease.

Figure 5:
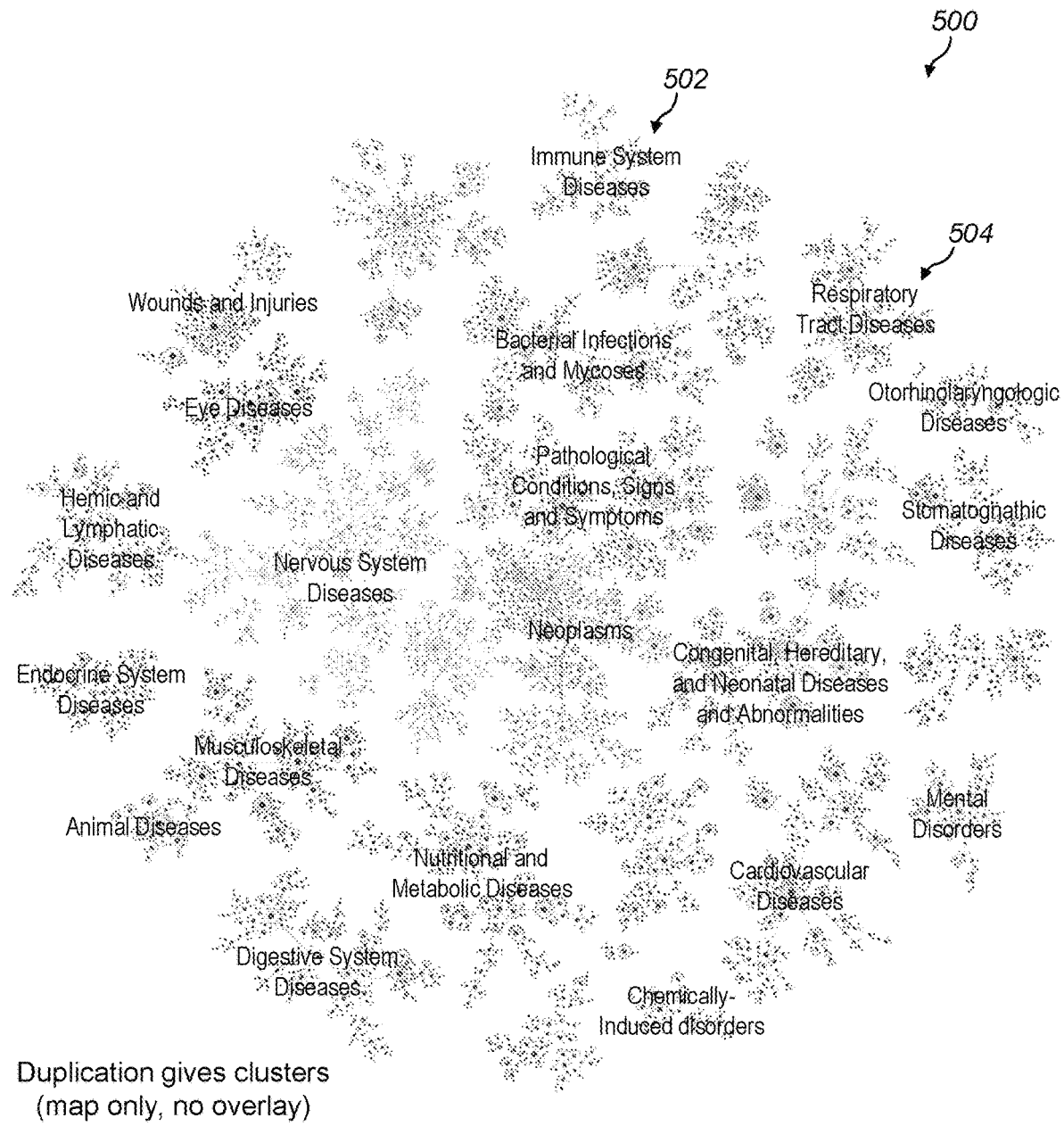
FIG. 5 is a visualisation of the set of all diseases including duplicated diseases so that families of diseases such as immune system diseases and respiratory tract diseases naturally separate out into clusters which are easy to navigate rather than a tangled hairball arrangement which would otherwise arise.

If the approach of duplication is applied to the set of all 20,000 diseases, the diseases separate out into clusters of related diseases, rather than existing in a tangled hairball arrangement that would otherwise arise. FIG. 5 shows a visualisation 500 of this kind of the set of all diseases with duplication. The diseases separate out into twenty-seven clusters such as immune system diseases 502 and respiratory tract diseases 504. The same disease may appear in different clusters, in the same way that retinal vasculitis appears in different branches in FIG. 4, and the clustering makes the overall appearance of the visualisation 500 is much easier to view and to navigate.

Figure 6:
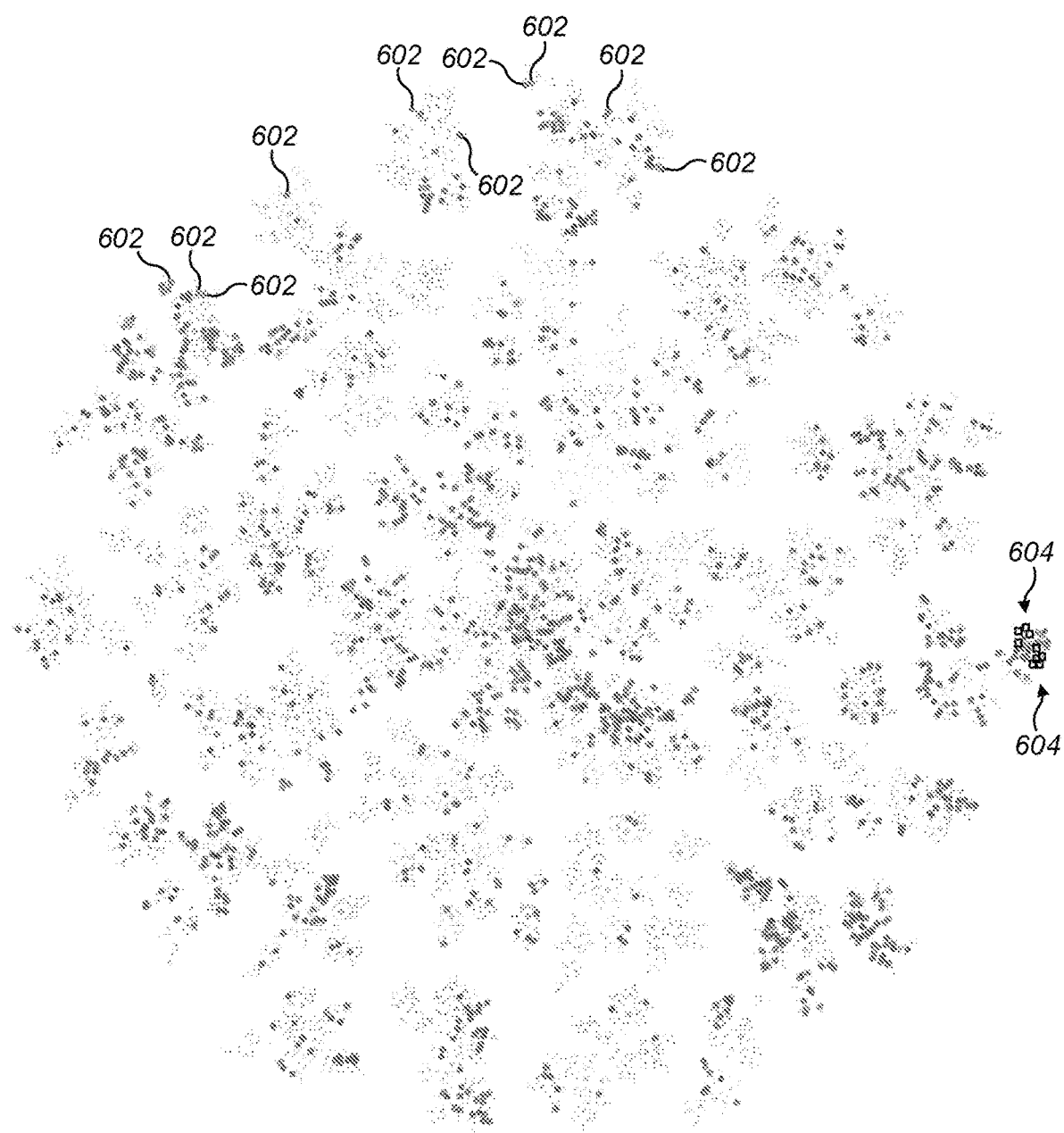
FIG. 6 is a visualisation of the set of all diseases including an overlay highlighting diseases that have shown up as results in a search for diseases that are associated with a particular gene, the visualisation additionally including a number of squares surrounding diseases of interest.

If the set of all diseases is searched using a search term representing a particular gene, the results that are associated with that gene can be highlighted as shown in FIG. 6. For example, some of the results that have shown up in the search and are highlighted are labelled with the reference numeral 602 in FIG. 6. The non-results are still shown in the visualisation, and they can be seen as the unhighlighted diseases.

If there are any diseases in the set of all diseases having an undiscovered association with the gene of the search term, these will exist among the non-results. Being able to find these undiscovered associations is important in knowledge discovery. Non-results that are reasonably closely related in a relationship tree to one or more results are candidates for having an undiscovered association with the gene. As such, a disease of interest may be considered to be a non-result having one or more results within a boundary in a relationship tree. For example, a disease of interest could be a non-result having at least three results within a boundary defined by a tree-traversal distance of no more than two parent-child relationships. In FIG. 6, some example diseases of interest are indicated by being surrounded by squares in region 604.

Figure 7:
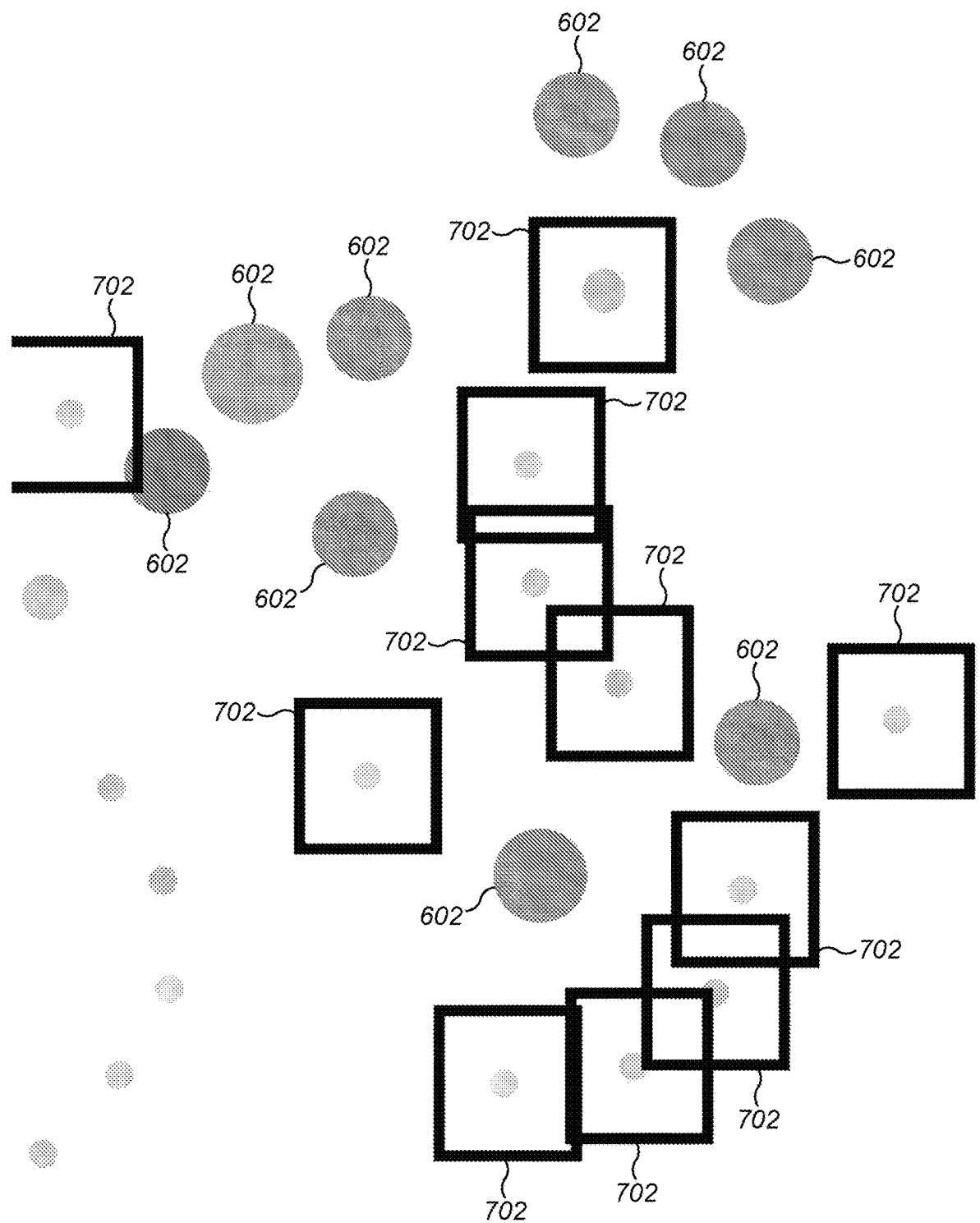
FIG. 7 is an enlarged portion of the above visualisation including the region with the squares.

FIG. 7 shows an enlarged version of the region 604 in FIG. 6. Results 602 are highlighted in the same way as in FIG. 6 and the example diseases of interest are surrounded by squares 702.

The boundary in a relationship tree may be defined in various ways. As mentioned above, a boundary around an example biological entity in a relationship tree could be defined as encompassing all the neighbouring biological entities in the relationship tree that are no more than a tree-traversal distance of two parent-child relationships away from the example biological entity. Another boundary could be defined as encompassing all the neighbouring biological entities no more than another maximum tree-traversal distance away. In another approach, a boundary around a could be defined as encompassing any parents, siblings and children of an example biological entity. A similar boundary could include any parents, siblings, children and grandchildren of a biological entity. In this approach, another boundary could encompass any parents, siblings, and descendants of a biological entity. It will be appreciated that these are examples of boundaries and other boundaries around a biological entity in a relationship tree could be defined in other ways.

As mentioned above, any undiscovered associations that may exist between biological entities will be found among the non-results in a search. By contrast, the results relate to associations that have already been discovered. For the purpose of knowledge discovery, it may be suitable to look for undiscovered associations by identifying non-results that are reasonably closely related in a relationship tree to one or more of the results.

Figure 8:
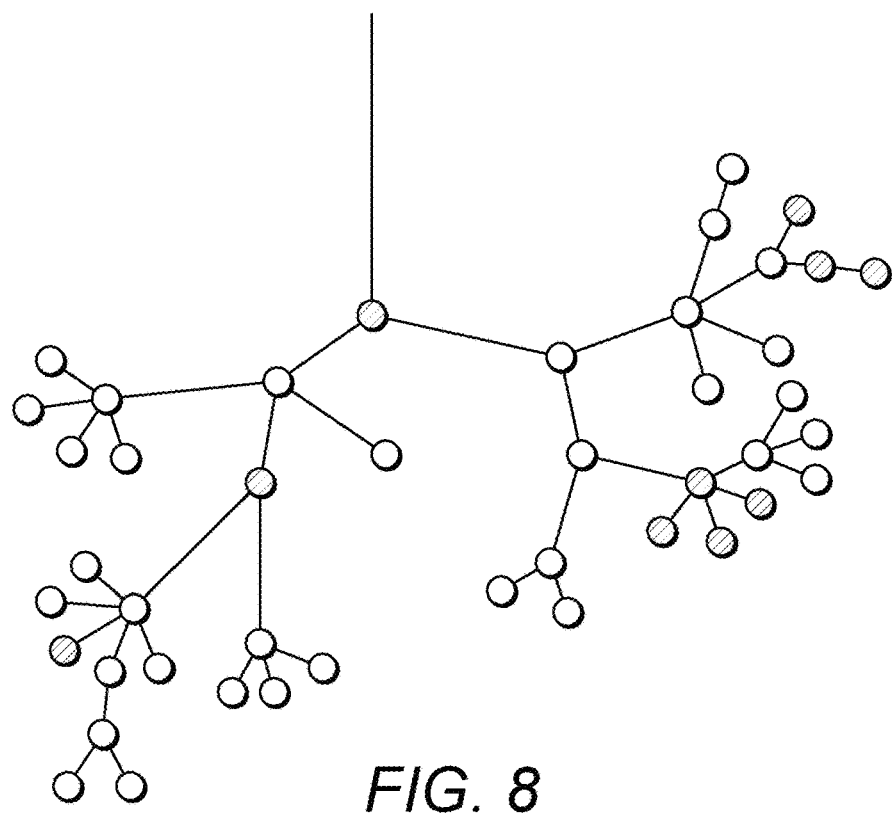
FIG. 8 is a schematic diagram of a subset of biological entities in which biological entities showing up as results in a search are highlighted.

As a first step, the results need to be identified. FIG. 8 shows a portion of a relationship tree of biological entities, in which the biological entities that show up as results in a search for biological entities being related to a particular biological entity such as a particular gene being highlighted. The highlighting takes the form of filled in circles to represent the biological entities that are results in the search. Biological entities that are non-results are not highlighted and, instead, are represented by unfilled circles.

To find potential candidates for undiscovered associations, the non-results that have one or more results within a boundary are identified. To achieve this, an analysis of each non-result is performed. For each non-result (represented by an unfilled circle), a boundary is applied and it is checked whether or not at least one neighbouring biological entity within the boundary is a result. If there is at least one result within the boundary, then the non-result is a candidate. If there are no results within the boundary, then the non-result is not a candidate.

For example, a boundary may be applied to the 34 non-results of FIG. 8. If the boundary is defined as encompassing any parents, siblings and descendants of a biological entity, then this yields 15 candidate biological entities from FIG. 8.

Figure 9:
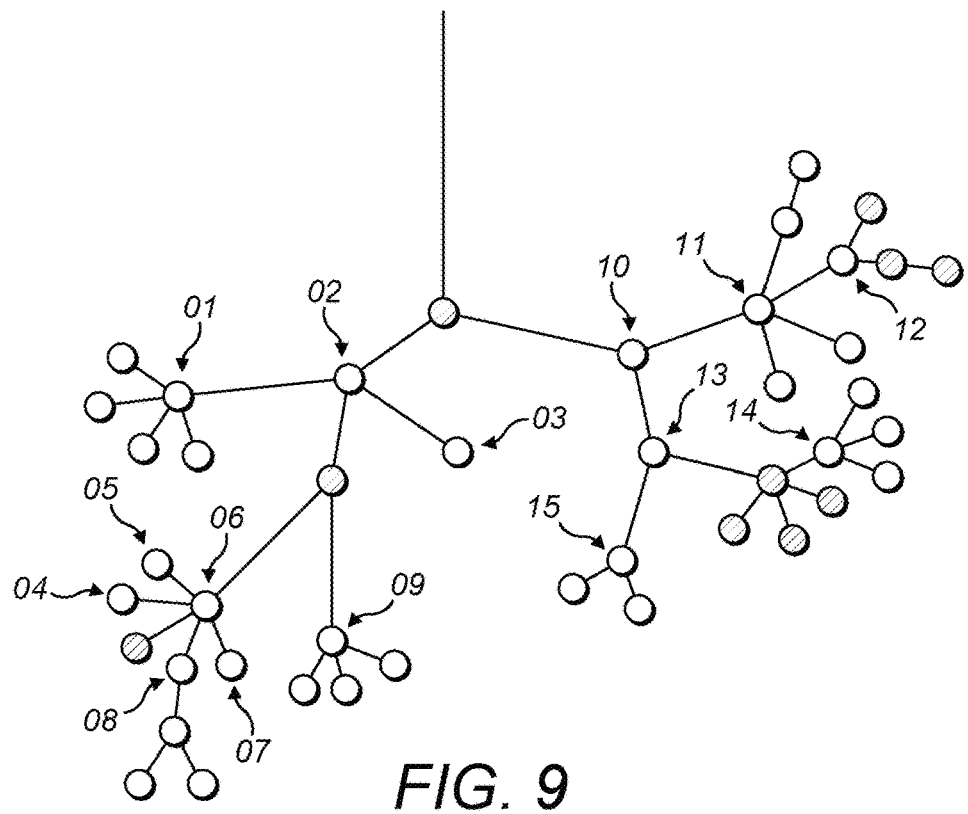
FIG. 9 is a schematic diagram similar to FIG. 8 in which some of the biological entities that did not show up as results in the search are identified as being candidates potentially of interest.

FIG. 9 shows the 15 candidates labelled with reference numerals 1-15. (In FIG. 9, the non-results are represented by unfilled circles and the results are shown as filled circles—the same as FIG. 8.)

A further constraint narrowing down the 15 candidates may be applied. This may take the form of calculating a score for each candidate and only accepting candidates with a score equal to or above a threshold. The scores may be calculated using various functions. In general, it may suitable for the functions to reward there being more rather than fewer results within a boundary of a non-result. It may additionally or alternatively be suitable for the functions to reward proximity of the results within the boundary to the non-result.

For example, according to an example function, a score for a non-result could be calculated by summing the inverse of the tree-traversal distance to each of the results from the non-result. In this case, a non-result having five results within a boundary, each of which is a tree-traversal distance of, say, three parent-child relationships away, will have a higher score than a non-result with only four results within the boundary, each of which is three parent-child relationships away. Similarly, a non-result having five results within a boundary, each of which is at a tree-traversal distance of, say, two parent-child relationships away, will have a higher score than a non-result with five results within the boundary that are further, for example three parent-child relationships, away. Thus, this function rewards higher numbers of results within the boundary, as well as rewarding the proximity of those results. Another example function could be to sum the inverse of the square of the distances to each of the results from the non-result. Another function could be to apply the summing only to the most proximal five results inside the boundary. It is also possible to use a function that takes into account the semantic scope of the results compared to the non-result. For example, referring to FIG. 3, the non-result vascular disease 304 has a parent, cardiovascular disease 302. The parent is semantically broader because cardiovascular disease is a broader category of diseases than vascular disease. Similarly, vasculitis 302 is a child of vascular disease 304 so it has a narrower semantic scope than vascular disease 304 because vasculitis is a subset of vascular disease. Some other diseases (not shown in FIG. 3) may have a similar semantic scope to vascular disease 304, for example any siblings of vascular disease. The semantic scope of a result compared to a non-result may be taken into account when calculating a score for the non-result. For example, parent results may make a lower contribution to the score because they are semantically broader. Sibling results may make a medium contribution to the score because their semantic scope is similar. Child results may make a higher contribution to the score because they are semantically narrower. This reflects the fact that, for example, a child result is likely to be relevant to a non-result because it is a subset of the non-result, whereas a parent result may be a result only by virtue of including other diseases that are not so relevant to the non-result.

As an example, the first function introduced above of summing the inverse tree-traversal distances of all the results within the boundary may be applied to the 15 candidates of FIG. 9. This will generate a score for each candidate, and the candidates can be narrowed down to a short-list by applying a minimum required score.

FIG. 10 shows the scores and how they are calculated for each of the candidates 1-15. In FIG. 10, a threshold score of 2.0 or higher is required and this constraint is used to filter the candidates down to short-list. For example, referring to FIGS. 9 and 10, biological entity 01 has a score of 0.5. This is calculated by first identifying any results within a boundary of parents, siblings and descendants of the non-result 01. As shown in FIG. 9, the candidate 01 has a parent but this is also a non-results. Candidate 01 has four descendants (all children) but these are also non-results. However, candidate 01 has to siblings. Of these, one is a result. Therefore, candidate 01 has one result, which is a sibling, within the applied boundary. The sibling is a tree-traversal distance of two parent-child relationships away from the candidate 01, so the inverse distance is ½. Since there is only one result within the boundary, there are no other inverse distances to sum with, and the final score is ½=0.5. A similar process may be applied to candidate 02. This candidate 02 has a parent that is a result (having an inverse distance of 1/1). Candidate 02 also has two descendants that are results (at distances of 1 and 3, generating inverse distances of 1/1 and ⅓ respectively). Candidate 02 has no siblings that are results. Therefore the score is the sum of the inverse distances to results within the boundary: $1/1+1/1+1/3=2.33$.

When this process is applied to all the candidates, scores are generated ranging from 0.5 to 3.25, as shown in FIG. 10. Applying a minimum required score of 2.0 filters the 15 candidates down to a short-list of six biological entities of interest. These are candidates 02, 06, 10, 12, 13 and 14.

Figure 12:
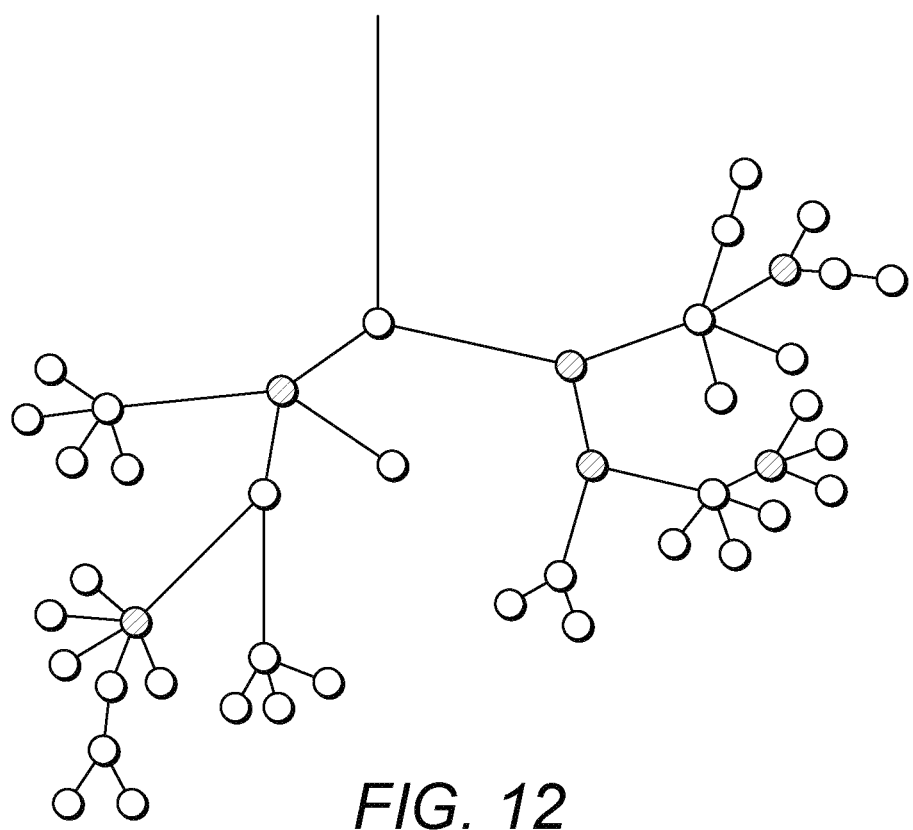
FIG. 12 is a schematic diagram similar to FIG. 8 in which the diseases of interest scoring a threshold or higher are highlighted.

These six biological entities of interest may be outputted to a user in various ways. For example, as shown in FIG. 11 they may be outputted in the form of a list in order of score with the highest scoring biological entity at the top of the list. Additionally or alternatively, they may be outputted in the form of highlighted entities in a visualisation of the relationship tree. As shown in FIG. 12, the final six candidates are highlighted by being represented by filled circles, while all other biological entities of the tree are represented by unfilled circles.

Figure 13:
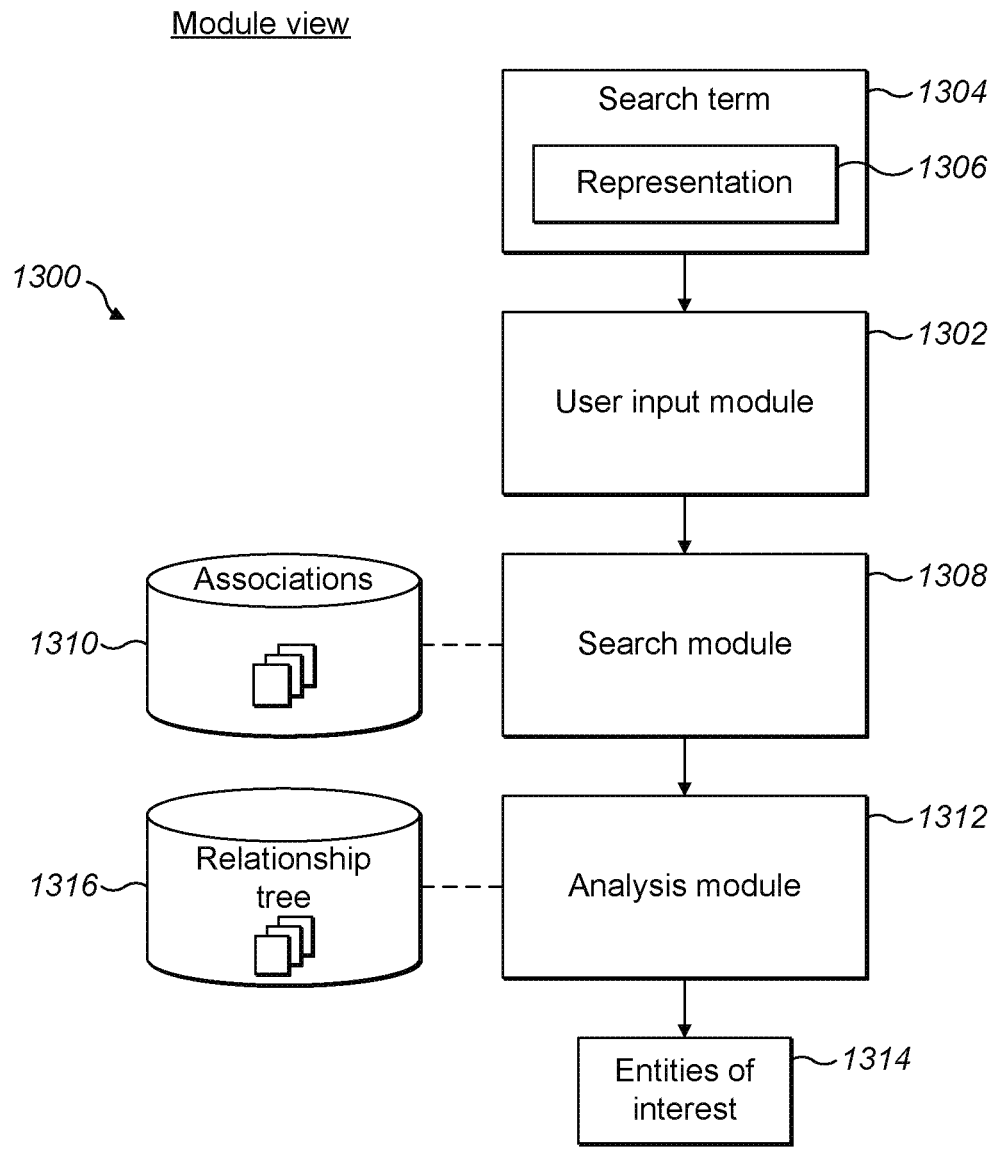
FIG. 13 is a schematic diagram of a module view of a system for searching a set of entities according to the present disclosure.

FIG. 13 illustrates a module view of a system 1300 for determining biological entities of interest according to the present disclosure. The system 1300 includes a user input module 1302 configured to receive a search term 1304 comprising a representation 1306 of a biological entity. The system 1300 also comprises a search module 1308 configured to determine which biological entities of a set have a known association with the biological entity of the search term, those having a known association being results and those not having a known association being non-results, wherein biological entities of the set are related to each other by parent-child relationships in a relationship tree. The search module 1308 may be communicatively connected to an associations database 1310 storing known associations. The system 1300 also comprises an analysis module 1312 configured to determine biological entities of interest 1314 by identifying non-results that have one or more results within a boundary in the relationship tree. The analysis module 1312 may be communicatively connected to a relationship tree database 1316 storing the relationship tree.

Figure 14:
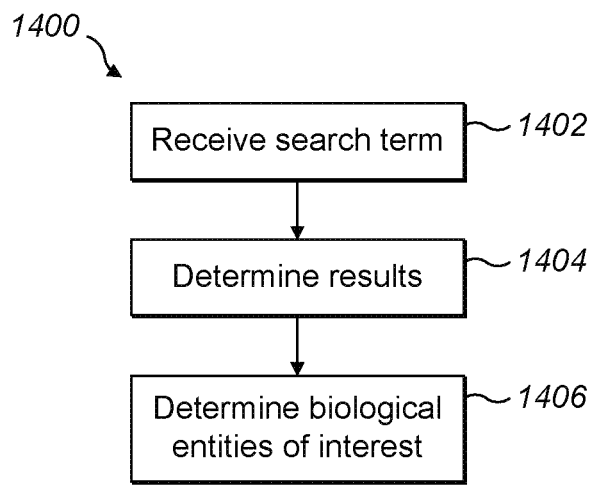
FIG. 14 is a flow chart showing a method of searching a set of entities according to the present disclosure.

With reference to FIG. 14, the present disclosure includes a computer-implemented method 1400 of determining biological entities of interest. The method comprises receiving 1402 a search term comprising a representation of a biological entity; determining 1404 which biological entities of a set have a known association with the biological entity of the search term, those having a known association being results and those not having a known association being non-results, wherein biological entities of the set are related to each other by parent-child relationships in a relationship tree; and determining 1406 biological entities of interest by identifying non-results that have one or more results within a boundary in the relationship tree.

Figure 15:
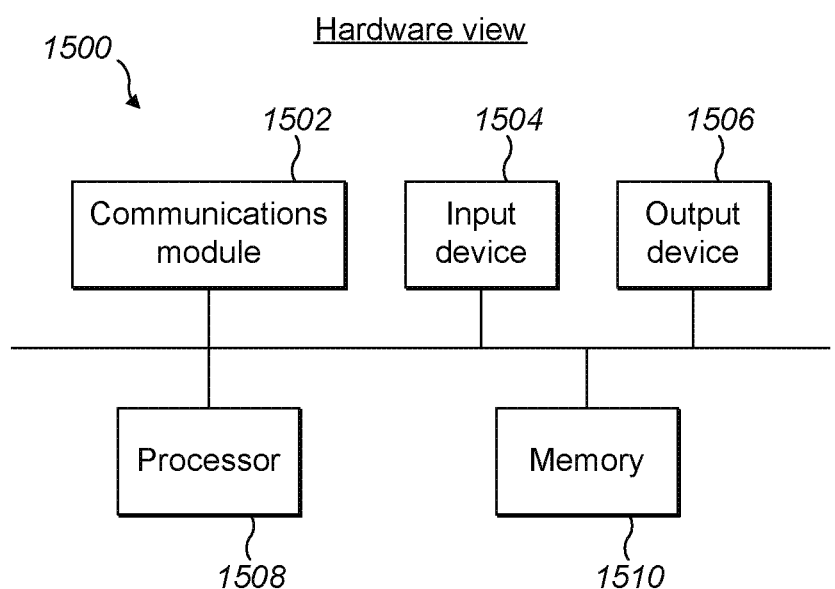
FIG. 15 is a block diagram of hardware suitable for implementing a system for searching a set of entities according to the present disclosure.

Referring to FIG. 15, the method 1400 may be implemented using hardware 1500. The hardware 1500 includes a communications module 1502, an input device 1504 suitable for receiving a user input, an output device 1506 which may comprise a display, a processor 1508, and memory 1510 which may suitably store a program that when run causes the processor to implement the method 1400.

In the embodiment described above the server may comprise a single server or network of servers. In some examples the functionality of the server may be provided by a network of servers distributed across a geographical area, such as a worldwide distributed network of servers, and a user may be connected to an appropriate one of the network of servers based upon a user location.

The above description discusses embodiments of the invention with reference to a single user for clarity. It will be understood that in practice the system may be shared by a plurality of users, and possibly by a very large number of users simultaneously.

The embodiments described above are fully automatic. In some examples a user or operator of the system may manually instruct some steps of the method to be carried out.

In the described embodiments of the invention the system may be implemented as any form of a computing and/or electronic device. Such a device may comprise one or more processors which may be microprocessors, controllers or any other suitable type of processors for processing computer executable instructions to control the operation of the device in order to gather and record routing information. In some examples, for example where a system on a chip architecture is used, the processors may include one or more fixed function blocks (also referred to as accelerators) which implement a part of the method in hardware (rather than software or firmware). Platform software comprising an operating system or any other suitable platform software may be provided at the computing-based device to enable application software to be executed on the device.

Various functions described herein can be implemented in hardware, software, or any combination thereof. If implemented in software, the functions can be stored on or transmitted over as one or more instructions or code on a computer-readable medium. Computer-readable media may include, for example, computer-readable storage media. Computer-readable storage media may include volatile or non-volatile, removable or non-removable media implemented in any method or technology for storage of information such as computer readable instructions, data structures, program modules or other data. A computer-readable storage media can be any available storage media that may be accessed by a computer. By way of example, and not limitation, such computer-readable storage media may comprise RAM, ROM, EEPROM, flash memory or other memory devices, CD-ROM or other optical disc storage, magnetic disc storage or other magnetic storage devices, or any other medium that can be used to carry or store desired program code in the form of instructions or data structures and that can be accessed by a computer. Disc and disk, as used herein, include compact disc (CD), laser disc, optical disc, digital versatile disc (DVD), floppy disk, and blu-ray disc (BD). Further, a propagated signal is not included within the scope of computer-readable storage media. Computer-readable media also includes communication media including any medium that facilitates transfer of a computer program from one place to another. A connection, for instance, can be a communication medium. For example, if the software is transmitted from a website, server, or other remote source using a coaxial cable, fiber optic cable, twisted pair, DSL, or wireless technologies such as infrared, radio, and microwave are included in the definition of communication medium. Combinations of the above should also be included within the scope of computer-readable media.

Alternatively, or in addition, the functionality described herein can be performed, at least in part, by one or more hardware logic components. For example, and without limitation, hardware logic components that can be used may include Field-programmable Gate Arrays (FPGAs), Program-specific Integrated Circuits (ASICs), Program-specific Standard Products (ASSPs), System-on-a-chip systems (SOCs). Complex Programmable Logic Devices (CPLDs), etc.

Although illustrated as a single system, it is to be understood that the computing device may be a distributed system.

Thus, for instance, several devices may be in communication by way of a network connection and may collectively perform tasks described as being performed by the computing device.

Although illustrated as a local device it will be appreciated that the computing device may be located remotely and accessed via a network or other communication link (for example using a communication interface).

The term 'computer' is used herein to refer to any device with processing capability such that it can execute instructions. Those skilled in the art will realise that such processing capabilities are incorporated into many different devices and therefore the term 'computer' includes PCs, servers, mobile telephones, personal digital assistants and many other devices.

Those skilled in the art will realise that storage devices utilised to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realise that by utilising conventional techniques known to those skilled in the art that all, or a portion of the software instructions may be carried out by a dedicated circuit, such as a DSP, programmable logic array, or the like.

It will be understood that the benefits and advantages described above may relate to one embodiment or may relate to several embodiments. The embodiments are not limited to those that solve any or all of the stated problems or those that have any or all of the stated benefits and advantages.

Any reference to 'an' item refers to one or more of those items. The term 'comprising' is used herein to mean including the method steps or elements identified, but that such steps or elements do not comprise an exclusive list and a method or apparatus may contain additional steps or elements.

As used herein, the terms "component" and "system" are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices.

Further, as used herein, the term "exemplary" is intended to mean "serving as an illustration or example of something".

Further, to the extent that the term "includes" is used in either the detailed description or the claims, such term is intended to be inclusive in a manner similar to the term "comprising" as "comprising" is interpreted when employed as a transitional word in a claim.

The figures illustrate exemplary methods. While the methods are shown and described as being a series of acts that are performed in a particular sequence, it is to be understood and appreciated that the methods are not limited by the order of the sequence. For example, some acts can occur in a different order than what is described herein. In addition, an act can occur concurrently with another act. Further, in some instances, not all acts may be required to implement a method described herein.

Moreover, the acts described herein may comprise computer-executable instructions that can be implemented by one or more processors and/or stored on a computer-readable medium or media. The computer-executable instructions can include routines, sub-routines, programs, threads of execution, and/or the like. Still further, results of acts of the methods can be stored in a computer-readable medium, displayed on a display device, and/or the like.

The order of the steps of the methods described herein is exemplary, but the steps may be carried out in any suitable order, or simultaneously where appropriate. Additionally, steps may be added or substituted in, or individual steps may be deleted from any of the methods without departing from the scope of the subject matter described herein. Aspects of any of the examples described above may be combined with aspects of any of the other examples described to form further examples without losing the effect sought.

It will be understood that the above description of a preferred embodiment is given by way of example only and that various modifications may be made by those skilled in the art. What has been described above includes examples of one or more embodiments. It is, of course, not possible to describe every conceivable modification and alteration of the above devices or methods for purposes of describing the aforementioned aspects, but one of ordinary skill in the art can recognize that many further modifications and permutations of various aspects are possible. Accordingly, the described aspects are intended to embrace all such alterations, modifications, and variations that fall within the scope of the appended claims.

The invention claimed is:

1. A system for searching a relationship tree to output biological entities of interest for drug discovery, the system comprising:
 a user input device configured to receive a search term comprising a representation of a biological entity, wherein the biological entity is one of a disease, a gene, a protein, a drug, a biological pathway, or a biological process;
 a computer comprising (a) a processor and (b) memory in communication with the processor and containing computer executable instructions that is configured, when executing the computer executable instructions, to implement a search module, an analysis module and a visualisation module; and
 a display device,
 wherein,
  the search module is configured to query an associations database storing known associations between biological entities to determine which biological entities of a set of biological entities have a known association with the biological entity of the search term,
 (a) the set of biological entities comprises biological entities of the same biological entity type that are related to each other by parent-child relationships in a hierarchical relationship tree, (b) the biological entity type comprises one of diseases, genes, proteins, drugs, biological pathways, or biological processes, (c) the biological entity type of the set of biological entities differs from the biological entity type of the search term, (d) the biological entities of the set that are determined as having a known association with the biological entity of the search term are results and those not having a known association are non-results, and (e) a known association comprises an association other than being related by a parent-child relationship in the hierarchical relationship tree;

the analysis module is configured to access a relationship tree database storing the hierarchical relationship tree to determine biological entities of interest within the hierarchical relationship tree by firstly identifying candidate biological entities as non-results that have one or more results within a threshold tree traversal distance of the non-result in the relationship tree and secondly calculating a score for each candidate biological entity using a function, where the function provides a higher score based on one or both of (1) the more results there are within the threshold tree traversal distance for the candidate non-result; and (2) the shorter a tree traversal distance in the relationship tree from the candidate non-result to a result within the boundary, wherein the analysis module is configured to determine candidate non-results having a score equal to or above a threshold score as biological entities of interest;

the visualisation module is configured to render on the display device a visualisation of the hierarchical relationship tree and a visual indication identifying each biological entity of interest within the relationship tree.

2. The system according to claim 1, wherein the one or more results comprises at least a threshold number of results.

3. The system according to claim 1, wherein the set of biological entities comprises a set of diseases.

4. The system according to claim 1, wherein the function comprises a sum of the inverse of the tree-traversal distance to each of the results from the non-result.

5. The system according to claim 1, wherein the analysis module is configured to generate a list of the entities of interest ranked by their respective scores.

6. The system according to claim 1, wherein the database comprises association data curated by a user.

7. The system according to claim 1, wherein the visualisation of the relationship tree comprises duplicated biological entities.

8. The system according to claim 1, wherein the display device is configured to render a visual indication identifying each result.

9. The system according to claim 1, wherein the system is configured to enable user selection of the set of biological entities.

10. A computer-implemented method of searching a relationship tree to output biological entities of interest for drug discovery, the method comprising:

receiving a search term with a user input device, the search term comprising a representation of a biological entity, wherein the biological entity is one or more of a disease, a gene, a protein, a drug, a biological pathway, or a biological process;

querying an association database storing known associations between biological entities to determine which biological entities of a set of biological entities have a known association with the biological entity of the search term, wherein (a) the set of biological entities comprises biological entities of the same biological entity type that are related to each other by parent-child relationships in a hierarchical relationship tree, (b) the biological entity type comprises one of: diseases, genes, proteins, drugs, biological pathways, or biological processes, (c) the biological entity type of the set of biological entities differs from the biological entity type of the search term, (d) the biological entities of the set that are determined as having a known association are results and those not having a known association are non-results, and (e) a known association comprises an association other than being related by a parent-child relationship in the hierarchical relationship tree;

accessing a relationship tree database storing the hierarchical relationship tree to determine biological entities of interest within the hierarchical relationship tree by firstly identifying candidate non-results that have one or more results within a threshold tree traversal distance of the non-result in the relationship tree and secondly calculating a score for each candidate non-result using a function, where the function provides a higher score based on one or both of (1) the more results there are within the threshold tree traversal distance for the candidate non-result, and (2) the shorter a tree traversal distance in the relationship tree from the candidate non-result to a result within the boundary; determining candidate non-results having a score equal to or above a threshold score as biological entities of interest; and rendering on a display device a visualisation of the hierarchical relationship tree and a visual indication identifying each biological entity of interest within the relationship tree.

11. The method according to claim 10, wherein the one or more results comprises at least a threshold number of results.

12. The method according to claim 10, comprising generating a list of the entities of interest ranked by their respective scores.

13. The method according to claim 10, wherein the database comprises association data curated by a user.

14. The method according to claim 10, wherein the visualisation of the relationship tree comprises duplicated biological entities.

15. The method according to claim 10, comprising rendering a visual indication identifying each result.

16. The method according to claim 10, wherein the system is configured to enable user selection of the set of biological entities.

* * * * *